UNITED STATES PATENT OFFICE.

ELISHA M. POMEROY, OF WALLINGFORD, CONNECTICUT.

IMPROVEMENT IN MAKING PAPER BUTTONS.

Specification forming part of Letters Patent No. 3,281, dated September 23, 1843; Reissue No. 58, dated November 24, 1843.

*To all whom it may concern:*

Be it known that I, ELISHA M. POMEROY, of Wallingford, county of New Haven, and State of Connecticut, have invented new and useful Improvements in the Mode of Manufacturing Paper Dead-Eye Buttons, of which the following is a specification.

The nature of my improvements consists in preparing the button to receive a smooth coat of varnish or the finishing luster, and also in securing that luster to the button in the highest degree and by the most economical method.

To enable others skilled in the art to use my invention, I proceed to describe the same, as follows:

Take paper in sheets of suitable thickness, and out of the same cut blocks of the size required by means of the press and die commonly used in cutting out metallic or other dead-eye buttons. The blocks are then passed into a die, by means of which and the common press the buttons are shaped and the eyes punched. They are now immersed in a composition of linseed-oil, or any fixed oil, and spirits of turpentine in equal parts, or parts nearly equal, and when fully saturated the composition is drawn off and the buttons removed in pans or other suitable vessels to the kiln or oven, where they are baked for two or three days, and until the buttons become dry and hard. They are now revolved in a cylinder, which is perforated with holes, in order that the dust may escape, until the rough parts of the button are removed, when they are put into another cylinder, together with so much Japan varnish, either of the fixed oils, spirits of tar or turpentine, either separate or mixed, in any proportion, with or without blacking, as they will receive without adhering to each other, but sufficient to cover the whole surface, which will be nearly in the proportion of one quart of the liquid to one bushel of buttons, and again revolved until the buttons become dry, by which operation the pores of the paper are filled and the button is prepared to receive a smooth coat of varnish. They are then removed in pans, as before, to the kiln or oven and baked until the coating last received by the button becomes too hard to incorporate with that which follows. The buttons are now immersed in Japan varnish and spread on boards and baked until the varnish becomes hard; or they may be finished by putting them into a cylinder together with so much Japan or other varnish as they will receive upon their surface without adhering to each other (which will be very nearly in the proportion of one-half pint of varnish to one bushel of buttons) and revolved until they have all received a like coating of the varnish, at which time and before the luster is destroyed they are removed to the kiln or oven and baked until dry and hard, when they are finished and ready for packing.

I do not claim as my invention the cutting out or shaping the block, punching the eyes, hardening the button, or removing the roughness thereof by means of the cylinder; but I do claim as my invention and a new and useful improvement—

1. The process by which the button, after its roughness is removed, is prepared to receive a smoth coat of varnish, and which consists in revolving the buttons in a cylinder together with so much Japan varnish, either of the fixed oils, or spirits of tar or turpentine, either separate or mixed, in any proportion, with or without blacking, as they will receive without adhering to each other, but sufficient to cover the whole surface of the button (which will be nearly in the proportion of one quart of the liquid to one bushel of buttons) until the buttons become dry, by which operation the pores of the paper are filled and the button is prepared to receive a smooth coat of varnish.

2. The mode of giving to the button, when prepared by the last-named process, a smooth coat of varnish or the finishing luster, which said mode consists in revolving the buttons in a cylinder with so much Japan or other varnish as they will receive upon their surface, and until all have received a slight coating of the same, at which time and before they have lost their luster they are again removed to the kiln and baked until dry, when they are finished and prepared for packing, all substantially in manner specified above.

ELISHA M. POMEROY.

Witnesses:

EDGAR ATWATER,

E. H. IVES.